Feb. 17, 1942. C. F. FREDE 2,273,635
RAILWAY TRUCK STRUCTURE
Filed June 14, 1940 3 Sheets-Sheet 1

INVENTOR.
CHARLES F. FREDE
BY Rodney Bedell
ATTORNEY.

Feb. 17, 1942.   C. F. FREDE   2,273,635
RAILWAY TRUCK STRUCTURE
Filed June 14, 1940   3 Sheets-Sheet 2

INVENTOR.
CHARLES F. FREDE
BY
ATTORNEY.

Feb. 17, 1942.　　C. F. FREDE　　2,273,635
RAILWAY TRUCK STRUCTURE
Filed June 14, 1940　　3 Sheets-Sheet 3

INVENTOR.
CHARLES F. FREDE
BY *Rodney Bedell*
ATTORNEY.

Patented Feb. 17, 1942

2,273,635

UNITED STATES PATENT OFFICE 2,273,635

RAILWAY TRUCK STRUCTURE

Charles F. Frede, University City, Mo., assignor to General Steel Castings Corporation, Granite City, Ill., a corporation of Delaware Application June 14, 1940, Serial No. 340,485

11 Claims. (Cl. 188—153)

The invention relates to railway truck structure and to fluid operated brakes for the truck wheels, and more particularly to arrangements in which individual cylinders and pistons are provided for each wheel.

In some respects the structure illustrated in the accompanying drawings and described below corresponds to that shown in companion applications, Serial No. 314,369, filed January 18, 1940, and Serial No. 340,484, filed herewith by the present applicant and in which clasp brake and brake actuating units are mounted upon brackets detachably assembled with the remainder of the truck structure. The structure embodying this present invention involves the application of the braking units direct to the truck equalizer frame structure and actuating brake shoes applied to the wheel treads.

The main object of the present invention is to simplify the application of brakes to the wheel tread by mounting an individual cylinder and piston unit for each wheel directly on the truck framing structure which extends between the wheels.

Another object of the invention is to provide an effective clasp brake structure actuated by such a unit.

Another object of the invention is to minimize the play between the truck wheel and the brake structure applied thereto.

Another object of the invention is to increase the contact area between the wheel and the brake shoes without increasing the likelihood of the brake shoes dragging on the wheels when the brakes are released. In the usual suspension of brakes from truck frames which are spring supported on the axles, the vertical play of the frame and brakes relative to the wheels tends to restrict the length which may be assumed by the brake shoes without their end portions contacting the wheels when the brakes are released.

These and other detail objects of the invention as will appear from the following description are attained by the structure illustrated in the accompanying drawings in which—

Figure 1:
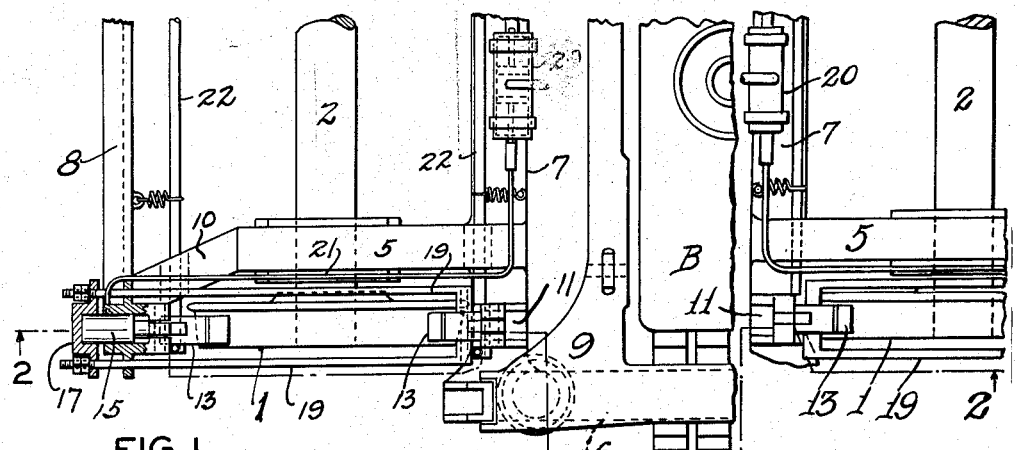
Figure 1 is a top view of substantially one half of a railway four wheel truck embodying one form of the invention with portions broken away and with portions sectioned horizontally in part to more clearly illustrate certain details of the construction. The truck is of the pedestal type fitted with removable journal boxes.
Figure 2:
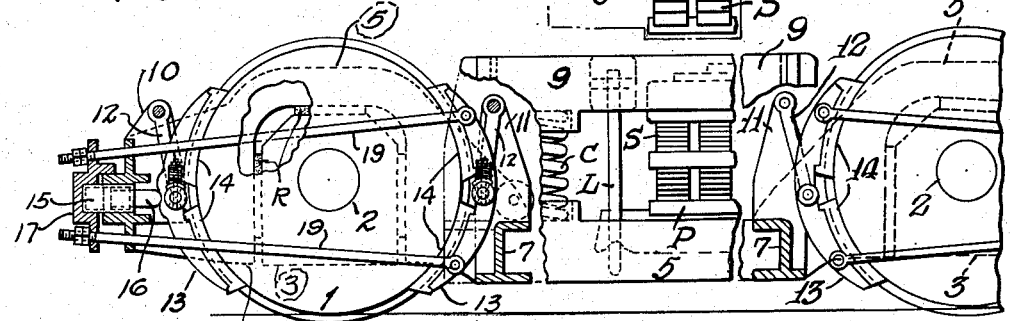
Figure 2 is a side elevation and vertical longitudinal section taken on the line 2—2 of Figure 1.
Figure 3:
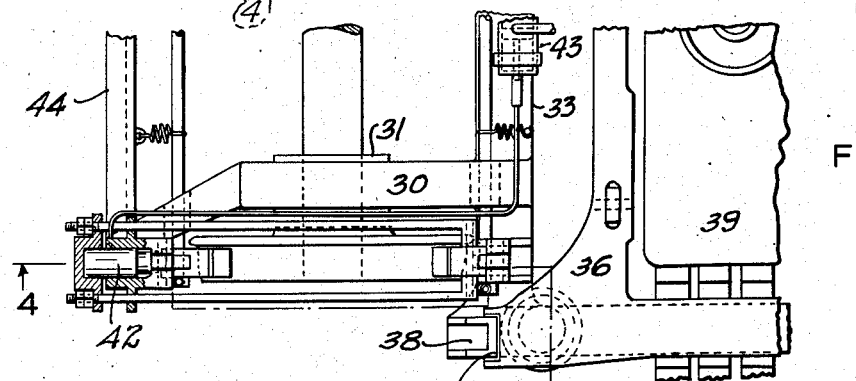
Figure 4:
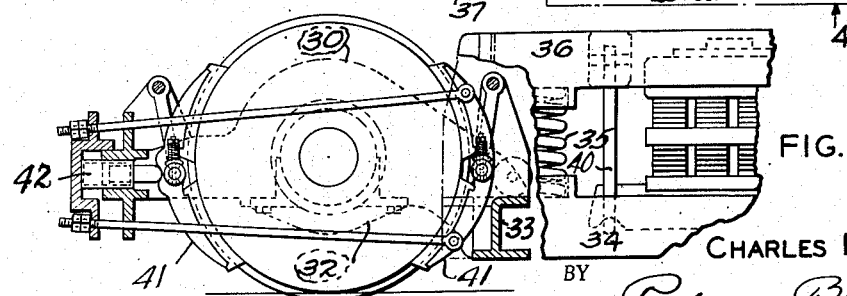

Figures 3 and 4 correspond to the left hand portions of Figures 1 and 2 respectively, but illustrate another form of the invention in which the equalizer frame and journal bearing are integral.

Figure 5:
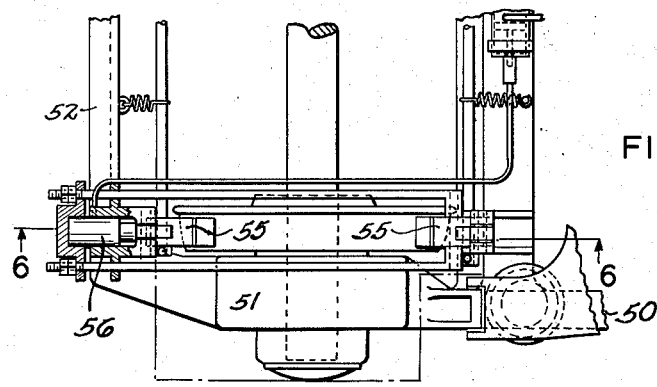
Figure 6:
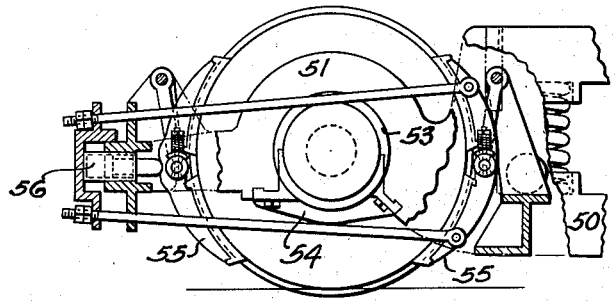

Figures 5 and 6 correspond to Figures 3 and 4 respectively, but illustrate a form of the invention in which the equalizer frame structure provides an outside bearing for the axle journal.

Figure 7:
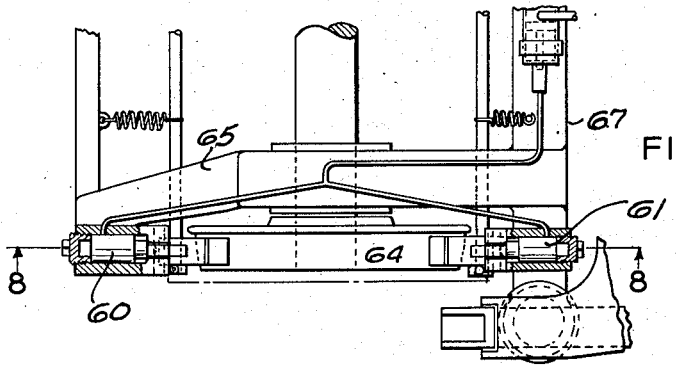
Figure 8:
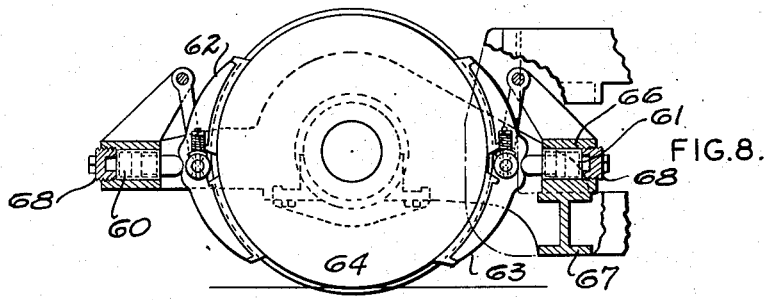

Figures 7 and 8 correspond to Figures 3 and 4 respectively, but illustrate a form of the invention which includes an individual operating unit for the shoe at each side of the wheel.

Figure 9:
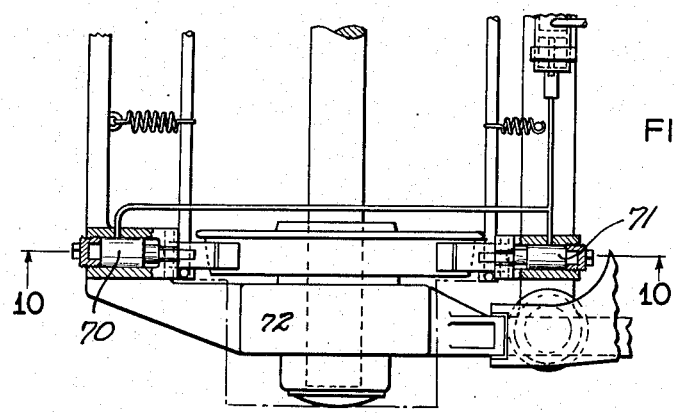
Figure 10:
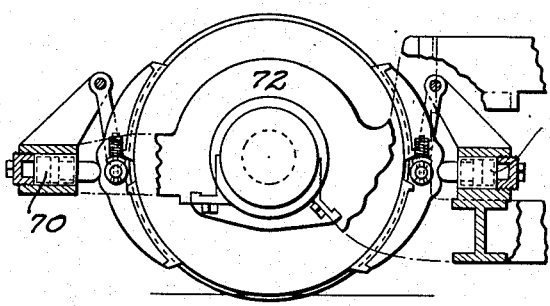

Figures 9 and 10 correspond to Figures 5 and 6 respectively in including an outside bearing, and correspond to Figures 7 and 8 respectively in including an individual operating unit for the shoe at each side of the wheel.

Figure 11:
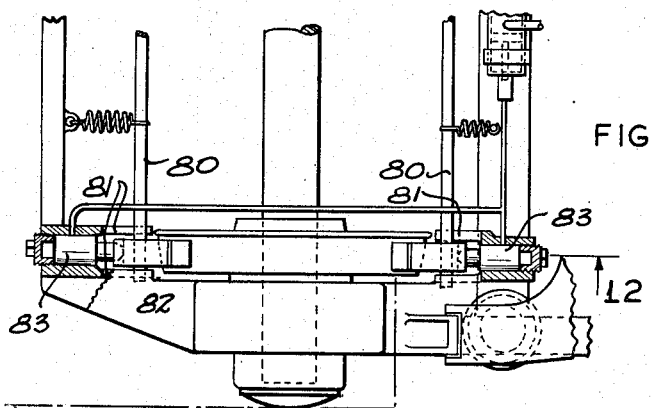
Figure 12:
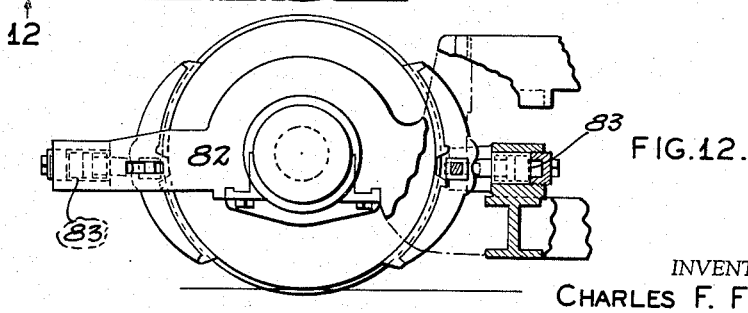

Figures 11 and 12 correspond to Figures 9 and 10 respectively, but illustrate a form of the invention in which the brake shoes are slidably mounted upon the equalizer frame structure instead of being supported therefrom by hangers, as in the other forms of the invention.

Referring to the structure shown in Figures 1 and 2, truck wheels 1 are mounted upon the truck axles 2 in the usual manner, and the axles have inside journals carrying the journal boxes 3 which are received between the pedestal legs 4 of an equalizer frame structure, including end members 5 positioned inwardly of the longitudinal vertical plane of the wheels and from which the pedestal legs depend, and also including intermediate members 6 positioned outwardly of the longitudinal plane of the wheels. The frame also includes transverse members 7 which connect the ends of the outer side members 6 with the inner ends of the inner side members 5. End transverse members 8 connect the outer ends of the inner side members at opposite sides of the truck. It is to be understood that the wheel, brake and associated structure are duplicated at the opposite end of each axle.

Preferably, rubber pads R are provided between the sides and top of the boxes and the legs and top of the pedestal jaws. The equalizing frame mounts coil springs C which support a rectangular frame 9 from which links L are pivotally suspended and carry a spring plank P mounting elliptic springs S for the bolster B, as is familiar practice.

A bracket 10 is formed on the end of member 5 and a corresponding bracket 11 is formed on transverse member 7 between members 5 and 6. Brake hangers 12 are pivotally suspended from brackets 10 and 11 and carry brake heads 13, each arranged to mount a pair of shoes 14 for engaging the wheel tread.

A brake beam 22 extends between brake heads 13 at opposite sides of the truck and holds the heads against undue lateral play, but beam 22 is not used to support the heads or to transmit braking forces. The brake heads and shoes are thrust towards the wheel by an operating unit comprising a fluid containing cylinder 15 mounted in an opening in bracket 10 and provided with a piston 16 with an end projecting from the cylinder and engaging the adjacent brake head 13. The outer end of cylinder 15 is seated in a plate 17 connected by two pairs of rods 19 with the brake head 13 at the opposite side of the wheel. One pair of rods extend alongside of the inner face of the wheel, one above the axle and one below the axle, and the other pair of rods are similarly disposed alongside of the outer face of the wheel.

Cylinder 15 receives fluid through a conduit 21 from a master air and hydraulic cylinder 20 mounted on transom 7. Cylinders 15 and 20, as illustrated, are of one type disclosed in a companion application, Serial No. 314,432, filed January 18, 1940, by the present applicant and Emil J. Schleicher. If desired, each cylinder 15 may be a combined air and hydraulic fluid cylinder of another type described in said Schleicher and Frede application, Serial No. 314,432, or may be as previously described but operated by straight air pressure from the air reservoir instead of by hydraulic fluid.

With the construction just described, there is no relative vertical movement of the box and pedestal except that which would result from the distortion of rubber pads 9, and this would be so slight that the relative position of the brake shoes and the wheel would remain substantially the same at all times thus tending to eliminate chatter or any other undesirable condition due to changes in the positions of the brake shoes relative to the wheel contour which would occur if more substantial relative movement of the box and pedestal took place.

Figures 3 and 4 illustrate a similar brake operating arrangement but the inner member 30 of the equalizer frame structure forms a seat for the axle bearing 31, and the axle is retained by a removable cap 32, and this arrangement eliminates the journal box and its rubber mounting elements shown in Figures 1 and 2.

The equalizer frame includes transverse transom-like members 33, transverse end rails 44, and outer side members 34 terminating at members 33 and seating coil springs 35 which mount a bolster supporting frame 36 which is guided in its vertical movements by sliding engagement at 37 with an upright 38 on member 34. A bolster 39 is suspended from frame 36 by swinging links 40 which operate in a well known manner to provide lateral motion of the bolster and the vehicle body carried thereby relative to the truck.

Brake heads 41 and the operating units 42 are mounted and actuated as are the corresponding elements of the structure previously described. The combined air and hydraulic cylinder 43 connected to operating units 42 is carried on the equalizer frame transom 33.

With this structure there would be no relative vertical movement between the brake shoes and the wheels.

Figures 5 and 6 illustrate another form of the invention generally resembling that shown in Figures 3 and 4 but having the outer side member 50 of the equalizer frame extending at 51 alongside of the outer face of the wheel and connected to a transverse end rail 52. Outside bearings 53 are seated in extension 51 and the axle is retained in the bearing by the removable cap 54. The mounting of the brake heads 55 and their operation by units 56 corresponds to that previously described.

This construction provides a better equalizer arrangement because the equalizer frame extends in substantially straight lines between the axles.

Figures 7 and 8 illustrate a structure similar to that shown in Figures 3 and 4 but including individual operating units 60 and 61 for the brake heads 62 and 63, respectively, at the opposite sides of the wheel 64. The left hand unit 60 is mounted in the outer end of the inner member 65 of the equalizer frame similar to the mounting of unit 42 in Figures 3 and 4. The inner operating unit 61 is mounted in a suitable pocket element 66 carried on or formed integral with the transverse member 67 of the equalizer frame.

With this arrangement, the tie rods between the inner brake heads and the cylinder plate are eliminated and each cylinder 60 and 61 is backed up by an adjustable stop 68 threaded into the cylinder receiving pocket element, and the cylinder does not move during the application and release of the brakes.

Figures 9 and 10 illustrate a similar arrangement of individual brake heads operating units 70 and 71 applied to an equalizer frame structure including an axle bearing bracket 72 extending alongside of the outer face of the wheel, as in the construction illustrated in Figures 5 and 6.

In all of the above described structures the brake heads are suspended from the equalizer frame member by links and movement of the brake heads to and from the wheel is effected by the swinging action of the links about their pivots. This mounting of the brake heads is not essential, and Figures 11 and 12 illustrate another arrangement in which the brake beam member 80 extends through slots 81 formed in the equalizer frame structure 82, and the beam and shoes are slidable longitudinally of the truck in these slots by the action of units 83.

Other details of the construction may be varied without departing from the spirit of the invention and the exclusive use of those modifications which come within the scope of the claims is contemplated.

What is claimed is:

1. In a railway truck, wheels, axles, equalizer framing carried thereby, brake shoe units at opposite sides of one of said wheels, and individual fluid operated cylinder and piston units for each shoe unit mounted in said framing and arranged to thrust the respective shoe units towards said wheel.

2. In a railway truck, wheels, axles, equalizer framing carried thereby, a fluid operated cylinder and piston unit for each wheel mounted in said framing with its axis perpendicular to the adjacent wheel tread surface, and brake shoe units applicable to the tread surface of said wheel at opposite sides of the axle and operable by said cylinder and piston unit.

3. In a railway truck, wheels, axles, equalizer framing carried thereby, a fluid operated cylinder and piston unit slidable on said framing longitudinally of the truck towards and from one of said wheels, a brake shoe between said wheel and the adjacent end of said unit, a brake shoe at the opposite side of said wheel, and a connection between the latter-mentioned brake shoe and the other end of said unit, whereby admission of fluid under pressure to said unit will apply both of said shoes to said wheel.

4. In a railway truck, wheels, axles, equalizer framing carried thereby and having a pocket opening longitudinally of the truck opposite to the tread of one of said wheels, a brake shoe unit pivotally suspended from said framing between said pocket and wheel, and a fluid operated cylinder and piston unit having a seat in said pocket, and an element forming part of said cylinder and piston unit movable away from said seat and in operative engagement with said shoe unit to apply the latter to said wheel.

5. In a railway truck, wheels, axles, equalizer framing carried thereby and having a recess opening at opposite ends towards and away from the tread of one of said wheels, a fluid operated piston and cylinder unit slidable in said recess, brake shoes at opposite sides of said wheel and operable by said piston and cylinder unit from opposite ends of said unit whereby admission of fluid under pressure to said unit will apply said shoes to said wheel.

6. In a railway truck, an axle with wheels, equalizer framing carried thereby, units including fluid operated cylinders fixedly mounted on said framing at opposite sides of the axle, pistons in said cylinders and operable independently of each other, brake shoes between said units and a wheel on said axle and operable by said units whereby admission of fluid under pressure to said cylinders will apply said shoes separately to said wheel.

7. In a railway truck, wheels and axles, equalizer framing including parts extending alongside the inner faces of the wheels and carried on said axles and provided with portions abreast of the treads of said wheels, brake shoes between each of said portions and the adjacent wheel treads nearest the end of the truck and fluid pressure operating units mounted in said portions and operatively connected to said shoes.

8. In a railway truck, wheels and axles, equalizer framing including members extending alongside the inner faces of said wheels and with their end portions extending transversely of the truck and abreast of the treads of said wheels, brake shoes carried by said framing between said end portions and the adjacent wheel treads, and fluid operated cylinder and piston units mounted in said end portions and operatively connected to said shoes, said shoes and their mountings on said framing being operatively connected to said units and unobstructed by truck parts at the outer faces of said wheels.

9. In a railway truck, wheels and axles, equalizer framing carried thereby, brake elements at opposite sides of each of said wheels, and individual power devices for actuating said elements housed in said framing adjacent to said elements.

10. In a railway truck, spaced axles with wheels, an equalizer member extending between and beyond said wheels and carried by said axles, a brake shoe unit for one of said wheels, and a fluid operated cylinder and piston unit mounted in said member outwardly of said wheel and arranged to thrust said shoe unit towards the wheel.

11. In a railway truck, spaced axles with wheels, an equalizer member extending between and beyond said wheels and carried by said axles, springs seated on said equalizer between said axles, a truck frame mounted on said springs and terminating short of said axles, a cylinder and piston unit in said member outwardly of one of said wheels, and a brake shoe unit operated thereby to contact said wheel.

CHARLES F. FREDE.